US012568936B2

(12) United States Patent
Van Den Berg et al.

(10) Patent No.: US 12,568,936 B2
(45) Date of Patent: Mar. 10, 2026

(54) ANIMAL HUSBANDRY SYSTEM

(71) Applicant: LELY PATENT N.V., Maassluis (NL)

(72) Inventors: Karel Van Den Berg, Bleskensgraaf (NL); Jan Lambertus Pastoor, Rijswijk (NL); Adrianus Cornelis Maria Meeuwesen, Zegge (NL); Paulus Jacobus Maria Van Adrichem, Delfgauw (NL)

(73) Assignee: LELY PATENT N.V., Maassluis (NL)

( * ) Notice: Subject to any disclaimer, the term of this patent is extended or adjusted under 35 U.S.C. 154(b) by 44 days.

(21) Appl. No.: 18/559,405

(22) PCT Filed: May 19, 2022

(86) PCT No.: PCT/IB2022/054676
§ 371 (c)(1),
(2) Date: Nov. 7, 2023

(87) PCT Pub. No.: WO2022/243927
PCT Pub. Date: Nov. 24, 2022

(65) Prior Publication Data
US 2024/0224946 A1 Jul. 11, 2024

(30) Foreign Application Priority Data
May 21, 2021 (NL) ..................................... 2028275

(51) Int. Cl.
*A01K 29/00* (2006.01)
*G06V 20/52* (2022.01)
*G06V 40/20* (2022.01)

(52) U.S. Cl.
CPC ............ *A01K 29/005* (2013.01); *G06V 20/52* (2022.01); *G06V 40/20* (2022.01)

(58) Field of Classification Search
CPC ........ A06V 20/52; G06V 40/20; A01K 29/00; A01K 29/005
(Continued)

(56) References Cited

U.S. PATENT DOCUMENTS 4,203,497 A * 5/1980 Harris ................. G01G 19/025
177/244
5,894,621 A * 4/1999 Kubo .................. A47L 11/4072
15/319
(Continued)

FOREIGN PATENT DOCUMENTS

EP 3 692 911 A1 8/2020
WO WO 2014/118788 A2 8/2014
(Continued)

OTHER PUBLICATIONS

International Search Report Issued Aug. 31, 2022, in PCT/IB2022/054676, filed on May 19, 2022, therein 4 pages.

*Primary Examiner* — Daquan Zhao
(74) *Attorney, Agent, or Firm* — Oblon, McClelland, Maier & Neustadt, L.L.P.

(57) ABSTRACT

An animal husbandry system, wherein a group of animals can move about freely in an area, the system comprising at least one weighing unit in the area, video monitoring and analyzing mechanism being provided suitable for establishing in conjunction with the at least one weighing unit whether an animal is positioned suitably on the weighing unit for a correct weighing, storing device being provided for storing data relating to each individual animal, such as weight data, control mechanism being provided, operatively connected to each weighing unit, the video monitoring and analyzing mechanism and the storing device, wherein the control mechanism is arranged to store weight data from each weighing unit in the storing device as soon as it is
(Continued)

established that an animal is positioned suitably on the weighing unit for a correct weighing.

17 Claims, 1 Drawing Sheet

(58) Field of Classification Search
USPC ...................................... 348/61, 64, 73, 169
See application file for complete search history.

(56) References Cited

U.S. PATENT DOCUMENTS

| | | | | |
|---|---|---|---|---|
| 8,282,557 | B2 * | 10/2012 | Haynes ................... | G16H 50/20 |
| | | | | 600/443 |
| 8,538,126 | B2 * | 9/2013 | Peacock ................. | A01K 29/00 |
| | | | | 382/116 |
| 9,226,481 | B1 * | 1/2016 | Paripati ................. | G01G 17/08 |
| 2008/0008357 | A1 | 1/2008 | Barreto Martins | |
| 2021/0289746 | A1 * | 9/2021 | Villalobos ............... | A01K 5/02 |

FOREIGN PATENT DOCUMENTS

| | | | |
|---|---|---|---|
| WO | WO 2015/104250 A1 | 7/2015 | |
| WO | WO 2015/174900 A1 | 11/2015 | |

* cited by examiner

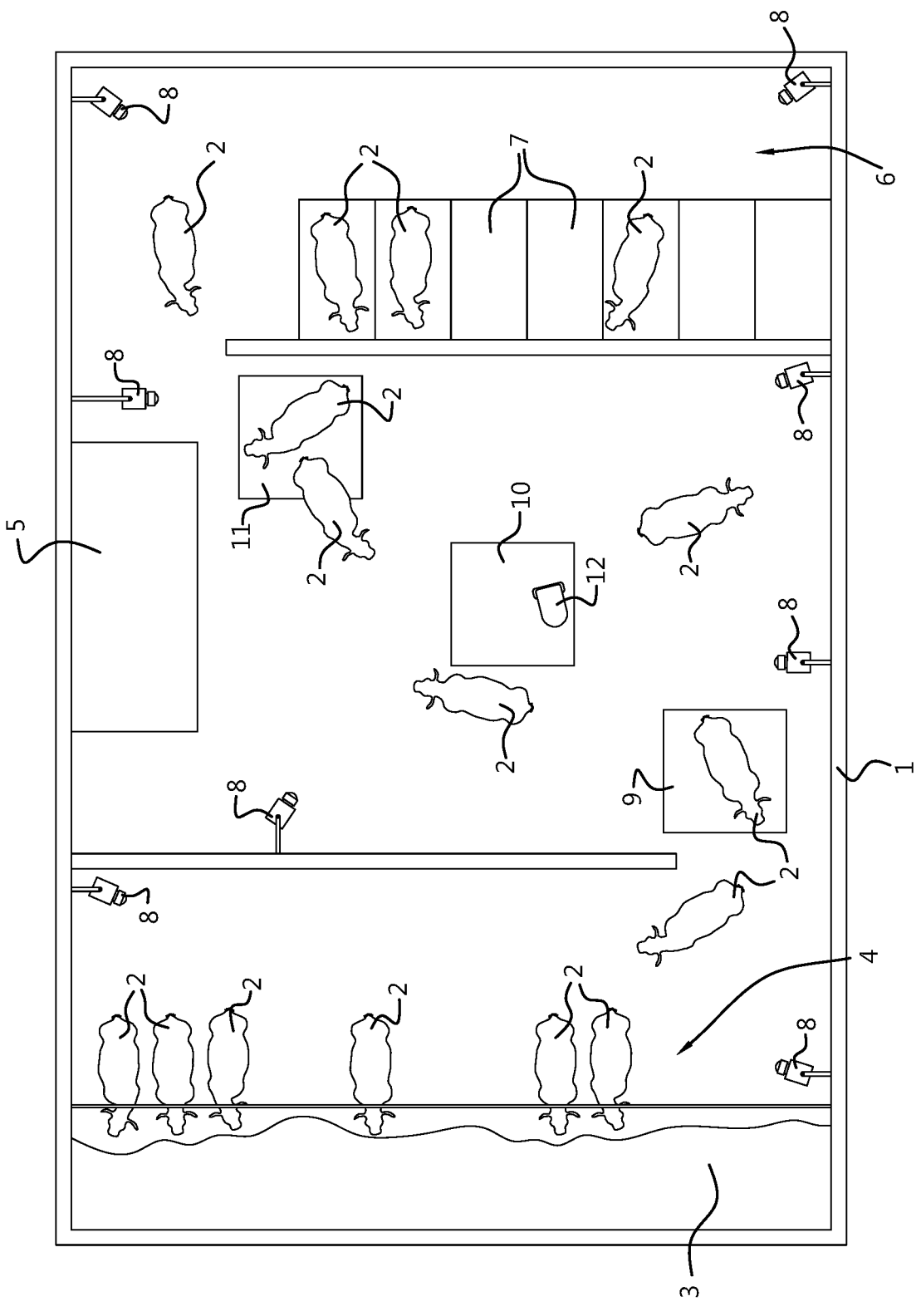

ANIMAL HUSBANDRY SYSTEM

CROSS REFERENCE TO RELATED APPLICATIONS

This application is a National Stage entry under 35 U.S.C. § 371 of PCT/IB2022/054676, filed on May 19, 2022, and claims priority to NL Patent Application No. 2028275, filed on May 21, 2021, the entire contents of which are incorporated herein by reference.

The present invention relates to an animal husbandry system.

Such systems are widely known in the art. Monitoring the animals in the system and gathering relevant animal data plays an important role in such systems. WO2014/118788 discloses an optical monitoring system for livestock in which various activities and parameters may be monitored and measured to determine the health state of the population of animals. WO2015/104250 divulges a method and system of livestock rearing in which the illumination in a shed is optimized. WO2015/174900 shows a system and method for estimating the solid feed consumption by animals on a farm on an animal individual level, the system for measuring a parameter indicative of a weight, size or shape of the animal comprising a weighing apparatus and/or an image based system for determining size and shape, such as a system for determining the BCS (body condition score) of the animals. U.S. Pat. No. 9,226,481 discloses a method and system for monitoring animal weight in which a photograph or image of a piezoelectric sheet weighing location is taken and analyzed to ensure that a single animal is present. If the animal in question has reached a certain threshold weight value, a notification is sent to a farm administrator. The photograph or image analysis is not very accurate, which leads to errors. Moreover, a weighing is only effected if a single animal is present at the piezoelectric sheet weighing location.

There is a need for an improved system with an accurate, yet flexible weighing procedure.

It is an object of the present invention to provide such an improved system.

The invention achieves the object at least in part by means of a system according to claim 1, in particular an animal husbandry system, wherein a group of animals can move about freely in an area, the system comprising at least one weighing unit located in the area, video monitoring and analyzing means being provided suitable for establishing in conjunction with the at least one weighing unit whether an animal is positioned suitably on the weighing unit for a correct weighing, storing means being provided for storing data relating to each individual animal, such as weight data, control means being provided, operatively connected to each weighing unit, the video monitoring and analyzing means and the storing means, wherein the control means are arranged to store weight data from each weighing unit in the storing means as soon as it is established that an animal is positioned suitably on the weighing unit for a correct weighing.

In this way, a highly useful, robust and flexible system is realized. The invention is based on the insight that the use of video monitoring and analyzing means in conjunction with a weighing unit enables an automatic and accurate weighing of animals moving about in an area. Even if more than one animal is exposing the weighing unit to pressure, a correct weighing is possible. Moreover, the feed and/or water intake of the animals can be monitored automatically and accurately.

Suitable and advantageous embodiments are described in the dependent claims, as well as in the description below.

According to a first embodiment of the invention, the at least one weighing unit is a platform with weighing cells. This is a practical and robust implementation enabling an accurate weighing.

According to a further embodiment, the upper surface of the at least one platform with weighing cells is made of a material which is softer than the floor of the area next to or surrounding the platform. In this way, the animals in the area are stimulated to visit the comfortable platform(s) and even stand still there, which leads to a highly reliable weight measurement.

Advantageously, tracking means are provided for identifying and tracking individual animals in the area. This can be done in various ways, known as such. For example, Radio Frequency Identification with tags/transponders and an antenna with a reader can be used. Alternatively, image analysis can be used with the aid of the video monitoring and analyzing means, e.g. recognizing the spotted pattern on the back of cows. A further possibility involves resetting the position of an animal every time it visits a certain known location, for example when a cow visits a milking robot in the area, and then tracking the animal from that known location using the video monitoring means. Knowing the exact location of the animals in the area has a lot of advantages. Individual animal data can be gathered.

According to yet a further embodiment, the control means are programmed for estimating and storing the feed and/or drink intake of an animal in a certain time interval based upon a plurality of weighings of said animal during said time interval. This enables the gathering of accurate, individual animal feed and/or drink intake data. The feed intake and the drink intake of the animals can be determined jointly or separately, as will be explained below.

Advantageously, the control means are programmed for generating a short term feed and/or drink intake pattern from the plurality of weighings of each animal and using said pattern for animal health monitoring. Strongly deviating feed and/or drink intake patterns can indicate acute health problems. Thus, animal health and welfare can be improved.

It is also beneficial if the control means are programmed for generating a long term feed and/or drink intake pattern from the plurality of weighings of each animal and using said pattern for animal breeding advice. In that way, animal breeding can be optimized, taking the animal feed and/or drink intake into account.

In accordance with a further embodiment of the invention, the area comprises a feeding and/or drinking area and a resting area for the animals, at least one of the at least one weighing units being positioned between the feeding and/or drinking area and the resting area. Positioning the weighing unit(s) in highly frequented spots in the area allows for a high number of animal weighings.

In a further embodiment, the control means are programmed for determining and storing a recent feed and/or drink intake of an animal by means of two consecutive weighings of said animal before and after it has visited the feeding and/or drinking area. This is a simple, yet highly efficient way of achieving reliable individual feed and/or drink intake data.

Advantageously, the control means are programmed for detecting, in conjunction with the video monitoring and analyzing means, animal excretion actions and/or animal excrement on the floor, and to link a detected animal excretion action and/or animal excrement to an individual animal in the area. This enables an even more accurate determination of the animal's individual feed and/or drink intake.

In a further embodiment, the control means are programmed for taking into account, in case the animal excrement detected on the floor is positioned on the at least one weighing unit and a correct weighing is possible, the weight of the detected animal excrement in the determination of the animal's feed and/or drink intake. This improves the accuracy of the feed and/or drink intake data significantly.

In yet a further embodiment, the control means are programmed for not taking into account, in case the animal excrement detected on the floor is not positioned on the at least one weighing unit or a correct weighing is not possible, the last or the next weighing of the animal in the determination of the animal's feed and/or drink intake. In this way, it is prevented that unreliable feed and/or drink intake data are gathered.

According to yet another embodiment, the control means are programmed for detecting, in conjunction with the at least one weighing unit, lameness by comparing the pressure or impulse or force exerted by all the animal's legs. A lame animal tends to relieve its lame leg and put more strain on the other leg(s). This can be detected by the system. Thus, animal health can be efficiently monitored.

In a further embodiment, wherein an unmanned cleaning vehicle is used for cleaning the area, the control means are arranged for registering and storing the weight of the unmanned vehicle as soon as it is established that the unmanned vehicle is positioned suitably on the weighing unit for a correct weighing. In this way, the degree of filling of the cleaning vehicle can be established easily and reliably.

Finally, in a further embodiment the control means are arranged to store weight data from each weighing unit in the storing means before, during and after it is established that an animal is positioned suitably on the weighing unit for a correct weighing. This is advantageous in that it enables the weighing units to be calibrated. The amount of manure on a weighing unit may vary in the course of time. Also, manure pollution at the sides of a weighing unit may cause friction and thus influence the weighing process. With weighings before, during and after a visit of an animal to the weighing unit, weighing errors can be assessed and, if necessary, corrected.

The invention will now be further explained with reference to the following FIGURE, which schematically illustrates the system according to the invention.

FIG. 1 shows an area with an animal husbandry system according to the invention.

FIG. 1 shows an animal husbandry system with a stable or shed or barn 1 wherein a group of animals 2 can move about freely. In the example shown the animals are cows. Of course, the invention can also be applied to an animal husbandry system involving other animals, such as goats, pigs, horses, chickens, turkeys, etcetera. The shed 1 can also be a structure with, for example, a partly open roof. The system according to the invention can in principle also be applied in an open area like a meadow or pasture with cattle fences.

The stable 1 has a feed alley 3, a feeding and/or drinking area 4 for the cows 2, a milking robot 5 for the cows 2 and a resting area 6 for the cows 2 with cubicles 7. One or more water troughs (not shown) may be placed in the area 4.

Furthermore, a number of video monitoring and analyzing means, here in the form of cameras 8, is provided. A plurality of illumination units (not shown) is also provided, suitable for illuminating respective different regions of the area or shed 1. The illumination units may be combined with or integrated in the cameras 8, but they can also be provided separately.

Weighing units 9, 10, 11 are provided on the stable floor. A control unit (not shown) with processing means and storing means is also provided, operatively connected to the cameras 8 and to the weighing units 9, 10, 11. The control unit may comprise a computer or any other suitable processing means. It can also be located outside or at a distance from the area or shed 1. Video analyzing means, known as such, can be incorporated in the cameras 8, or in the control means.

The cameras 8 are arranged for monitoring a region or a subarea or a number of subareas of the stable 1. Of course, other optical sensors can in principle be used also. The cameras 8 are provided in such a way that, collectively, they are suitable for monitoring substantially the complete shed 1, particularly the animals 2, the shed floor, and in particular the weighing units 9, 10, 11. The cameras 8 can be provided in the shed 1 above the animals 2, or as shown in FIG. 1, on the walls of the shed 1. They are positioned and oriented in such a way that all relevant subareas of the area 1 can be monitored. The subareas may overlap. Specifically, the cameras 8 are arranged suitably for monitoring all weighing units 9, 10, 11. In case the invention is used in a pasture, the cameras 8 may be provided on fences, at a sufficient height above the ground.

In the example shown, there are eight cameras 8. The chosen configuration obviously depends on the shape of the area or shed 1 and on the position of the weighing units 9, 10, 11.

An unmanned vehicle 12, for example used for cleaning purposes and known as such, can be moved about in the area 1 by means of the control means. The unmanned vehicle 12 will normally move about with the aid of its navigation system and visit each and every corner of the area 1. The vehicle 12 can comprise sucking means suitable for sucking up dirt and a collector for collecting the dirt. Its drive means can be charged at a base station in, at or near the stable 1 with means for charging the vehicle's batteries (not shown, known as such). In FIG. 1, the vehicle 12 is positioned on the weighing unit 10.

When keeping animals 2 in an area 1, it is often desirable to monitor the animals 2 and to gather specific animal data. In accordance with the invention, individual animal weight data can be reliably gathered, although the animals 2 are allowed to move about freely in the area 1.

To this end, the system comprises at least one weighing unit 9, 10, 11 located in the area 1, video monitoring and analyzing means 8 being provided suitable for establishing in conjunction with the at least one weighing unit 9, 10, 11 whether an animal 2 is positioned suitably on the weighing unit 9, 10, 11 for a correct weighing, storing means being provided for storing weight data relating to each individual animal 2, control means being provided, operatively connected to each weighing unit 9, 10, 11, the video monitoring and analyzing means 8 and the storing means, wherein the control means are arranged to store weight data from each weighing unit 9, 10, 11 in the storing means as soon as it is established that an animal 2 is positioned suitably on the weighing unit 9, 10, 11 for a correct weighing. The cameras 8, in conjunction with the video analyzing means and the control means, can detect whether a cow 2 is standing with all four legs on a weighing unit, as illustrated in FIG. 1 with reference to the weighing unit 9. If no other animal 2 is present, then a correct weighing is possible.

But even in case more than one animal 2 is exposing a weighing unit to pressure, as illustrated in FIG. 1 by weighing unit 11, a correct weighing may be possible. If a first cow 2, which is standing with its forelegs beside the weighing unit 11 and with its hind legs on the weighing unit 11, stands still for a while, while a second cow 2 enters the weighing unit 11, the (partial) weight value of the first cow can be filtered out by the control means, so that the weight of the second cow can be determined sufficiently accurately.

Thus, a very robust, yet flexible system is realized. The use of video monitoring and analyzing means 8 in conjunction with weighing units 9, 10, 11 enables an automated, accurate weighing of animals 2 moving about in an area 1.

Tracking means are provided for identifying and tracking individual animals 2 in the area 1. This can be done in various ways, known as such. For example, Radio Frequency Identification with tags/transponders and an antenna with a reader can be used. Alternatively, image analysis can be used with the aid of the video monitoring and analyzing means 8, e.g. recognizing the spotted pattern on the back of cows 2. Images of all cameras 8 can be combined to track each cow 2 in the whole barn 1. A further possibility involves resetting the position of an animal 2 every time it visits a certain known location, for example when a cow 2 visits a milking robot 5 in the area 1, and then tracking the animal 2 from that known location using the video monitoring means 8. Knowing the exact location of the animals 2 in the area 1 has a lot of advantages: individual animal data can be gathered.

The control means are programmed for estimating and storing the feed and/or drink intake of an animal 2 in a certain time interval based upon a plurality of weighings of said animal 2 during said time interval. This enables the gathering of accurate, individual animal feed and/or drink intake data. For example, during a day an animal 2 is weighed 4 or 5 times. Then the feed and/or drink intake of this animal 2 during this day can be calculated from the weighings, stored and monitored.

Preferably, the area 1 comprises a feeding and/or drinking area 4 and a resting area 6 for the animals, at least one of the at least one weighing units 9, 10, 11 being positioned between the feeding and/or drinking area 4 and the resting area 6. The cows 2 are likely to move from the resting area 6 with cubicles 7 to the feeding and/or drinking area 4 and back regularly during the daytime. Positioning the weighing unit(s) 9, 10, 11 in highly frequented spots in the area 1 allows for a relatively high number of animal weighings. The joint feed and drink intake of an animal 2 may thus be determined efficiently.

It is noted that in case one or more water troughs (not shown) is/are positioned separately in the area 4 at a certain distance from the feed alley 3, then the water intake and the feed intake of an animal 2 can also be determined separately by positioning one or more weighing units 9, 10, 11 near the water trough(s).

The control means are programmed for determining and storing a recent feed and/or drink intake of an animal 2 by means of two consecutive weighings of said animal 2 before and after it has visited the feeding and/or drinking area 4. This is a simple, but highly efficient way of achieving reliable individual feed and/or drink intake data. Comparing the animal's weight before and after its visit to the feeding and/or drinking area 4 enables the calculation of its recent feed and/or drink intake.

Preferably, the at least one weighing unit 9, 10, 11 is a platform with e.g. four weighing cells. This is a practical and robust implementation enabling an accurate weighing. The upper surface of the at least one platform 9, 10, 11 with weighing cells is made of a material (rubber) which is softer than the (concrete) floor of the area next to or surrounding the platform 9, 10, 11. In this way, the animals 2 in the area 1 are stimulated to visit the comfortable platform(s) 9, 10, 11 and even stand still there, which leads to a highly reliable weight measurement.

The control means are programmed for generating a short term feed and/or drink intake pattern from the plurality of weighings of each animal 2 and using said pattern for animal health monitoring. Strongly deviating feed and/or drink intake patterns can indicate acute health problems. Thus, animal health and welfare can be improved.

Optionally, the control means are programmed for generating a long term feed and/or drink intake pattern from the plurality of weighings of each animal 2 and using said pattern for animal breeding advice. In that way, animal breeding can be optimized, taking the animal feed and/or drink intake into account.

Advantageously, the control means are programmed for detecting, in conjunction with the video monitoring and analyzing means 8, animal excretion actions of feces and/or animal excrement on the floor of the area 1, and to link a detected animal excretion action and/or animal excrement to an individual animal 2 in the area 1. This enables an even more accurate determination of the animal's individual feed and/or drink intake.

The control means are programmed for taking into account, in case the animal feces detected on the floor is positioned on the at least one weighing unit 9, 10, 11 and a correct weighing is possible, the weight of the detected animal excrement in the determination of the animal's feed and/or drink intake. Deducting the excrement's weight improves the accuracy of the feed intake data significantly.

The control means are also programmed for not taking into account, in case the animal excrement detected on the floor is not positioned on the at least one weighing unit 9, 10, 11 or a correct weighing is not possible, the last or the next weighing of the animal 2 in the determination of the animal's feed and/or drink intake. If the weight of an excrement linked to a specific animal 2 cannot be determined accurately, this implies that the determination of the relevant animal's feed and/or drink intake is disturbed. In that case, the value of the last or the next weighing of the animal 2 may be ignored. In this way, it is prevented that unreliable feed and/or drink intake data are gathered.

The control means are further programmed for detecting, in conjunction with the at least one weighing unit 9, 10, 11, lameness by comparing the pressure or impulse or force exerted by all the legs of an animal 2 standing on a weighing unit 9, 10, 11. A lame animal tends to relieve its lame leg and put more strain on the other leg(s). This can be detected by the system. Thus, animal health can be efficiently monitored.

In an embodiment of the system, wherein an unmanned cleaning vehicle 12 is used for cleaning the area 1, as depicted in FIG. 1, the control means are arranged for registering and storing the weight of the unmanned vehicle 12 as soon as it is established that the unmanned vehicle 12 is positioned suitably on the weighing unit 9, 10, 11 for a correct weighing. In this way, the degree of filling of the cleaning vehicle 12 can be established easily and reliably.

In a further embodiment the control means are arranged to store weight data from each weighing unit 9, 10, 11 in the storing means before, during and after it is established that an animal 2 is positioned suitably on the weighing unit 9, 10, 11 for a correct weighing. This is advantageous in that it enables the weighing units 9, 10, 11 to be calibrated. The amount of manure on a weighing unit 9, 10, 11 may vary in the course of time. Also, manure pollution at the sides of a weighing unit 9, 10, 11 may cause friction and thus impair the weighing process. With weighings before, during and after a visit of an animal 2 to the weighing unit 9, 10, 11, weighing errors can be assessed and, if necessary, corrected.

The invention claimed is:

1. An animal husbandry system, wherein a group of animals can move about freely in an area, the system comprising:

a weighing unit located in the area;

video monitoring and analyzing means configured to establish in conjunction with the weighing unit whether an animal is positioned on the weighing unit for a correct weighing;

storing means being provided for storing data relating to each individual animal; and control means being provided, operatively connected to the weighing unit, the video monitoring and analyzing means and the storing means, wherein the control means are arranged to store weight data from the weighing unit in the storing means when it is established that an animal is positioned on the weighing unit for a correct weighing, wherein the area comprises a feeding and/or drinking area and a resting area for the animals, the weighing unit being positioned between the feeding and/or drinking area and the resting area, and wherein the animals can move freely between the feeding and/or drinking area, the resting area, and the weighing unit.

2. The system according to claim 1, wherein the weighing unit is a platform with weighing cells.

3. The system according to claim 2, wherein an upper surface of the platform with weighing cells is made of a material which is softer than a floor of an area next to or surrounding the platform.

4. The system according to claim 1, wherein tracking means are provided for identifying and tracking individual animals in the area.

5. The system according to claim 1, wherein the control means are programmed for estimating and storing the feed and/or drink intake of an animal in a certain time interval based upon a plurality of weighings of said animal during said time interval.

6. The system according to claim 5, wherein the control means are programmed for generating a short term feed and/or drink intake pattern from the plurality of weighings of the animal and using said pattern for animal health monitoring.

7. The system according to claim 5, wherein the control means are programmed for generating a long term feed and/or drink intake pattern from the plurality of weighings of the animal and using said pattern for animal breeding advice.

8. The system according to claim 1, wherein the control means are programmed for determining and storing a recent feed and/or drink intake of an animal by means of two consecutive weighings of said animal before and after it has visited the feeding and/or drinking area.

9. The system according to claim 8, wherein the control means are programmed for detecting, in conjunction with the video monitoring and analyzing means, animal excretion actions and/or animal excrement on a floor of the area, and to link a detected animal excretion action and/or animal excrement to an individual animal in the area.

10. The system according to claim 9, wherein the control means are programmed for taking into account, in case the animal excrement detected on the floor is positioned on the weighing unit and a correct weighing is possible, a weight of the detected animal excrement in the determination of the animal's feed and/or drink intake.

11. The system according to claim 9, wherein the control means are programmed for not taking into account, in case the animal excrement detected on the floor is not positioned on the weighing unit or a correct weighing is not possible, the last or the next weighing of the animal in the determination of the animal's feed and/or drink intake.

12. The system according to claim 1, wherein the control means are programmed for detecting, in conjunction with the weighing unit, lameness by comparing a pressure or impulse or force exerted by all the animal's legs.

13. The system according to claim 1, wherein when an unmanned cleaning vehicle suitable for cleaning the area is present, the control means is arranged for registering and storing a weight of the unmanned vehicle as soon as it is established that the unmanned vehicle is positioned on the weighing unit for a correct weighing.

14. The system according to claim 1, wherein the control means are arranged to store weight data from each weighing unit in the storing means before, during and after it is established that an animal is positioned on the weighing unit for a correct weighing.

15. The system according to claim 1, wherein the group of animals are COWS.

16. An animal husbandry system, wherein a group of animals can move about freely in an area, the system comprising:

a weighing unit located in the area;

video monitoring and analyzing means configured to establish in conjunction with the weighing unit whether an animal is positioned on the weighing unit for a correct weighing;

storing means being provided for storing data relating to each individual animal; and control means being provided, operatively connected to the weighing unit, the video monitoring and analyzing means and the storing means, wherein the control means are arranged to store weight data from the weighing unit in the storing means when it is established that an animal is positioned on the weighing unit for a correct weighing, and wherein the control means are programmed for detecting, in conjunction with the video monitoring and analyzing means, animal excretion actions and/or animal excrement on a floor of the area, and to link a detected animal excretion action and/or animal excrement to an individual animal in the area.

17. An animal husbandry system, wherein a group of animals can move about freely in an area, the system comprising:

a weighing unit located in the area;

video monitoring and analyzing means configured to establish in conjunction with the weighing unit whether an animal is positioned on the weighing unit for a correct weighing;

storing means being provided for storing data relating to each individual animal; and control means being provided, operatively connected to the weighing unit, the video monitoring and analyzing means and the storing means, wherein the control means are arranged to store weight data from the weighing unit in the storing means when it is established that an animal is positioned on the weighing unit for a correct weighing, and wherein the control means are programmed for detecting, in conjunction with the weighing unit, lameness by comparing a pressure or impulse or force exerted by all the animal's legs.

\* \* \* \* \*